United States Patent [19]
Hutsell

[11] Patent Number: 5,610,487
[45] Date of Patent: Mar. 11, 1997

[54] SERVO SYSTEM WITH ONCE PER REVOLUTION REJECTION

[75] Inventor: Larry G. Hutsell, Longmont, Colo.

[73] Assignee: Maxtor Corporation, Longmont, Colo.

[21] Appl. No.: 245,617

[22] Filed: May 19, 1994

[51] Int. Cl.⁶ .................... H02P 3/00; G11B 5/55
[52] U.S. Cl. .................... 318/560; 318/561; 318/610; 360/78.12; 360/78.04; 369/32
[58] Field of Search .................... 318/560–696; 360/70–89; 369/40–45

[56] References Cited

U.S. PATENT DOCUMENTS

| | | | |
|---|---|---|---|
| 4,894,599 | 1/1990 | Ottesen et al. | 318/636 |
| 4,949,036 | 8/1990 | Bezinque et al. | 360/31 |
| 5,045,950 | 9/1991 | Iwamura et al. | 358/319 |
| 5,087,997 | 2/1992 | Osada et al. | 360/78.06 |
| 5,136,441 | 8/1992 | Kobayashi | 360/78.12 |
| 5,199,017 | 3/1993 | Kagami et al. | 369/44.28 |
| 5,270,631 | 12/1993 | Takahashi et al. | 318/135 |
| 5,291,110 | 3/1994 | Andrews, Jr. et al. | 318/560 |
| 5,327,298 | 7/1994 | Ottesen et al. | 360/48 |
| 5,371,670 | 12/1994 | Lurie | 364/160 |
| 5,377,058 | 12/1994 | Good et al. | 360/75 |
| 5,402,400 | 3/1995 | Hamada et al. | 369/32 |

*Primary Examiner*—Paul Ip
*Attorney, Agent, or Firm*—Sheridan Ross PC

[57] ABSTRACT

A servo system for controlling the position of a read/write head over a rotating data disk is disclosed. The servo system includes the addition of a compensation scheme to the feedback loop that causes the open loop gain of the servo to increase only in a very narrow spectrum of its operating bandwidth. In a preferred embodiment, the compensation takes the form of a second order digital filter combined with a proportional-integral-differential phase compensation filter in the feedback loop of an embedded servo system for a digital data disk drive.

19 Claims, 8 Drawing Sheets

SERVO SYSTEM WITH ONCE PER REVOLUTION REJECTION

BACKGROUND OF THE INVENTION

1. Field of the Invention

This invention relates to a servo system for controlling the position of a read/write head over a rotating data disk. More particularly, it relates to the addition of a compensation scheme to the feedback loop of the servo that causes the gain of the servo to increase only in a very narrow spectrum of its operating bandwidth. In a preferred embodiment, the compensation takes the form of a second order digital filter combined with a proportional-integral-differential phase compensation filter in the feedback loop of an embedded servo system for a digital data disk drive.

2. Background

One of the most important data storage devices for digital computers is a class of devices known as disk drives. A disk drive consists of a rotating disk with magnetic media deposited on one or more surfaces in concentric information tracks. Information is stored in the magnetic media by causing magnetic domains to be in one of two polarities. The domains are switched from one polarity to another, in a write operation by a transducer. The same transducer also detects the state of each domain. The transducer and its mechanical housing is referred to as a "head".

Information is communicated to and from the disk by placing the head over a desired track and performing either a read or a write operation. The head is positioned by a mechanical arm called an actuator. The actuator is in turn caused to move by an electric motor which is connected through a digital to analog converter and amplifier to a digital computer. Here the term digital computer is used to mean any digital device utilizing logic and memory such as a microprocessor in conjunction with proms.

In the fabrication of disk drives, a hole is drilled as close to the center of the disk as the manufacturing process allows, and the disk is clamped to the shaft of an electric motor. The motor turns the disk. In this process, every effort is made to drill the hole and place the shaft around which the disk rotates in the precise center of the disk. But because of the tolerances in any manufacturing process, the hole is never exactly in the center of the disk.

Having the hole in the center of the disk is important when it comes to positioning the head over the disk. Because the information is written on tracks, the head must remain over the relevant track as the disk spins underneath the head. If the tracks are perfectly concentric, once the head is positioned over the proper track, the head never has to move. But if the tracks are not perfectly concentric, the track will move radially relative to the head, and the head will be forced to move if it is to keep the track directly beneath it.

One of the techniques developed to minimize this problem consists of writing the tracks after the center hole has been drilled and the shaft inserted and clamped. With precise track writing equipment the track may be written in a distorted manner that exactly compensates for the hole being not in the center of the disk. Thus, when the disk spins, the track will move beneath the head as if it were perfectly concentric with the shaft.

This technique works well under most circumstances. But, if the disk slips on the shaft after track writing, it will cause all of the tracks to oscillate in inertial space. And the frequency of the oscillation will be at the angular speed at which the disk spins. Typically this is between 60 and 80 revolutions per second. Thus, a track will not slide by directly under the head, but will appear to move radially.

Disks slip on their shaft when they are dropped or otherwise experience a mechanical shock. For desk top and larger computers, this is rare. For portable computers, it is not rare. And with the current state of the art, simply further tightening the clamp is not the answer since clamping tight enough to prevent slippage can cause the disk to warp.

As a first step in solving this problem, all disk manufacturers, use a servo loop to cause the head to "track" the data track. The servo loop controls the acceleration of the head caused by an electric motor that drives the actuator. The input to the servo are measurements of head position made by the head itself. The head position is determined from position indicators written directly onto the disk. That is, a certain number of bits of information on each track are reserved for providing position information. As the head passes over the indicators, the track over which the head is sitting is detected by the head itself and supplied to the servo. The indicators are at regularly spaced locations. Thus the input to the servo is not continuous, but is sampled.

In order for the servo to be effective, it must act quickly enough to cause the head to follow any radial movement of the track without losing data. Conventional servo design theory teaches that the ability of the servo loop to reject an external disturbance is a direct function of the open loop gain of the servo over the bandwidth of the disturbance. An external disturbance is anything that tends to cause a position error between the data track on the disk and the head. For definitional purposes, the bandwidth of the servo system may be conveniently defined as extending from a frequency of zero to the frequency at which the open loop gain is zero.

As with all servo systems that have other than all passive components, system stability is always a concern and a key design parameter. A servo may be said to be stable if, for small values of input, the output remains small or does not increase with time and thus without limit. A servo is known to be unstable if at the unity gain crossover point, that is the frequency at which the gain is one, the phase lag between the output and the input is 180 degrees.

This can be seen by reference to FIG. 1 which illustrates in block diagram form the most elemental servo system. In FIG. 1, a basic servo system consists of a plant/compensator element 10 and a feedback gain element 12 that takes the output back to the input. The modified output signal is then subtracted from the input signal at summing junction 14. The transfer function of this block diagram is set out in Equation 1 below:

$$\frac{\text{output}}{\text{input}} = \frac{G}{1 + GH} \quad (1)$$

where G is the gain and H is feedback gain. As can be seen, where the open loop gain, GH, equals −1, which is at zero decibels (db) of gain and a phase shift of −180 degrees, the denominator is zero and the expression becomes infinite, i.e. servo instability. Thus, merely closing a loop around an active element such as a transistor or a motor (referred to as the "plant" or the "dynamic equipment") can lead to an unstable servo. This problem is addressed by inserting compensation elements in the forward path of the loop. The main purpose of the compensation is to "peak the phase at the zero db crossover point". That is, the purpose is to modify the phase between the input and the output so that the output phase lag is some safe amount less than 180 degrees (usually 45 degrees) at the frequency that the gain of the closed loop system is unity.

The gain vs frequency response curve of a typical prior art actuator servo loop is shown in FIG. 2(a). There, the vertical axis represents gain in decibels ("db"). The horizontal axis represents frequency. Curve 16 represents a typical frequency response. As shown, it starts out high and gradually drops. It crosses the zero db line typically around 400 hz. FIG. 2(b) shows the phase relationship of the output to that of the input of a prior art servo whose gain vs frequency response is shown as curve 16 in FIG. 2(a). In FIG. 2(b), the vertical axis represents phase lag between the output and the input and the horizontal axis represents frequency. Curve 18 is the phase vs frequency curve corresponding to the gain vs frequency curve 16 of FIG. 2(a). As can be seen from curve 18, the phase lag starts off at −270 degrees. This is because, this application requires 3 integrators and each integrator adds 90 degrees of phase lag at dc (zero hz). The compensation added to the feedback loop "peaks the phase" from −270 degrees to a safe −135 degrees by the time the gain curve reaches the zero db frequency. As mentioned previously, increasing disk drive performance demands are forcing designers to attempt to increase the open loop gain. All prior approaches at increasing the open loop gain have been centered on moving the entire gain vs frequency curve up as illustrated by dotted line 17 in FIG. 2(a). As can be seen, this approach does effectively increase the open loop gain at the disturbance frequency but it also increases the bandwidth. That is, the frequency at which the gain is unity has moved from 400 hz to 600 hz. But at 600 hz, the phase lag is back at −180 and the servo is unstable. Thus, in order to improve the open loop gain and keep the servo stable, the phase must be "peaked up" even more. This is expensive in that it requires higher performance components and more complex circuits, and there are practical limits as to how high the open loop gain can be pushed due to noise inherent in the system and the fact that the system is sampled.

OBJECTS OF THE INVENTION

Thus, is an object of this invention to improve the disturbance rejection of a data disk storage device actuator servo in a new and useful way.

It is another object of this invention to provide an actuator servo with increased open loop gain at the precise point in the servo bandwidth that it is needed and without having to extend the overall servo bandwidth.

It is yet another object of this invention to provide increased open loop gain at no increased manufacturing cost.

It is yet another object of this invention to increase the open loop gain at a specified frequency without adding any additional components.

SUMMARY OF THE INVENTION

These and other objects of the invention may be achieved by an actuator servo system for controlling the position of a transducer mounted thereon over any selected location of a data disk rotating at a fixed angular speed and where the data disk has a plurality of spaced apart position indicators which are detected by the transducer. which in turn supplies a position signal indicating the position of the transducer over the disk, a feedback loop which responds to the output of the transducer by comparing the position indicated by the transducer with a desired position and provides an output error signal to the motor that moves the actuator such that the transducer moves closer to the desired position, and wherein the rejection of external disturbances caused by the rotating data track being non-concentric is proportional to the servo system gain at the angular speed of the data disk, the improvement including a peaking means disposed within the feedback loop and adapted to increase the gain of the servo system substantially only at the angular speed of the data disk and without appreciably increasing the phase lag of the servo system at the zero db crossover frequency.

DETAILED DESCRIPTION OF THE INVENTION

The present invention attacks this problem by first recognizing and taking advantage of the fact that the disturbance for which the servo is needed is very special. It occurs at only one frequency, and is a very precise frequency. It is the frequency at which the disk rotates. Indeed, most commercial disk drives have a separate and independent servo loop dedicated to maintaining the rotational speed of the disk constant and disk speed is typically controlled to less than ±0.25%.

Figure 1:
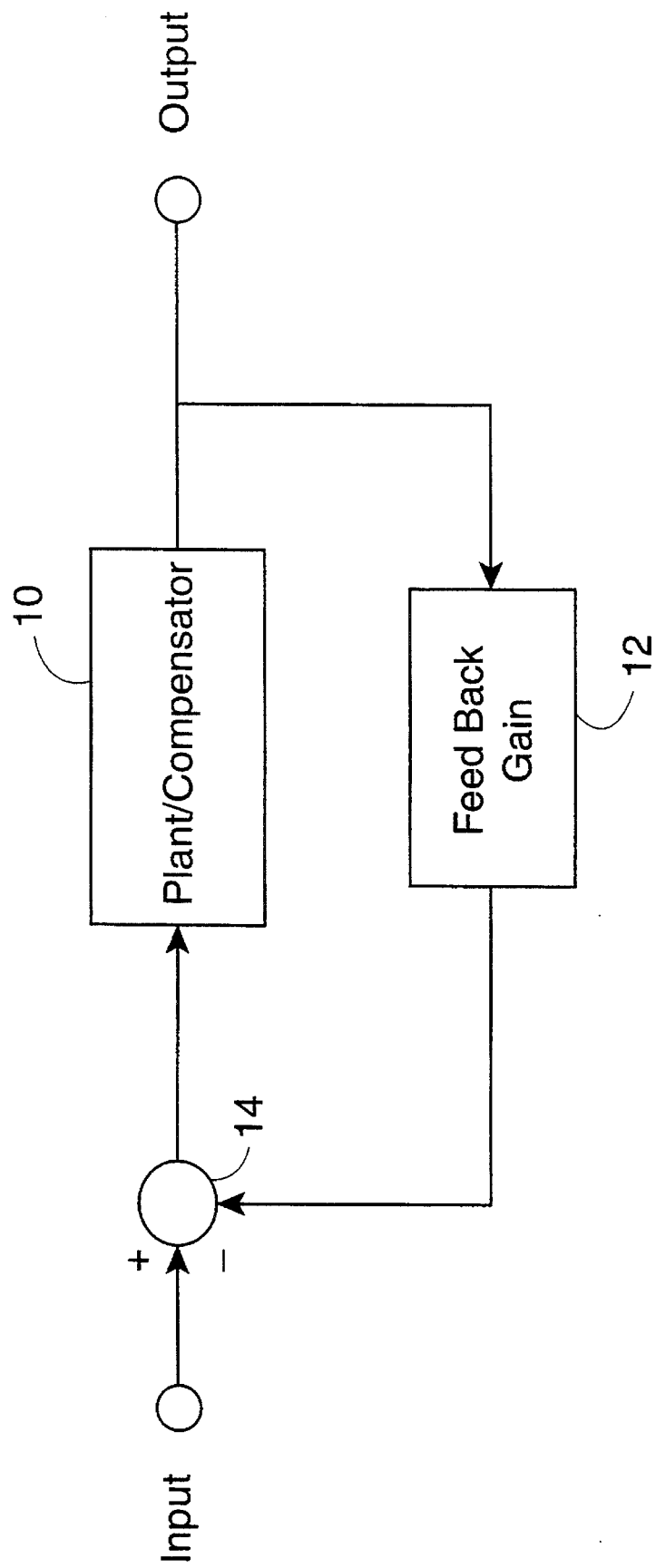
FIG. 1 is a block diagram of a servo system in its most basic form useful for explaining the background of the invention.
Figure 2A:
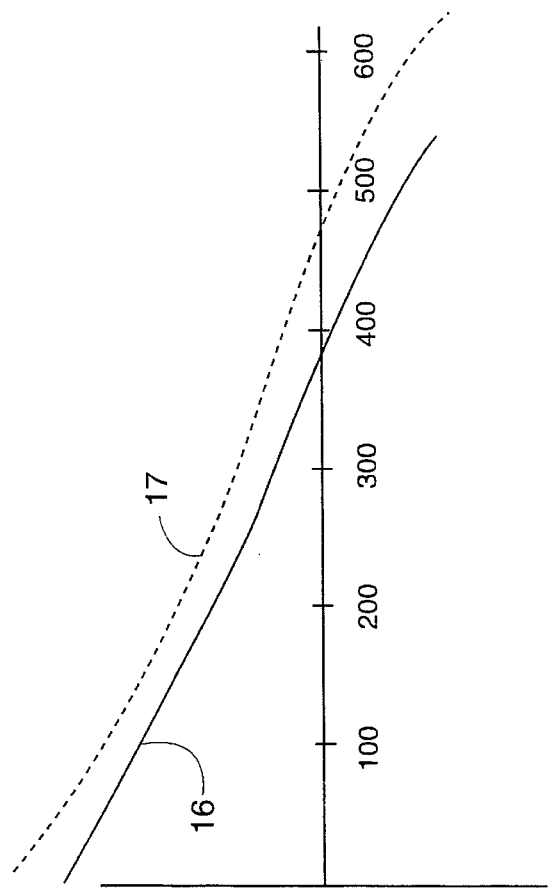
FIG. 2(a) is a gain vs frequency set of curves for typical prior art actuator servo systems.
Figure 2B:
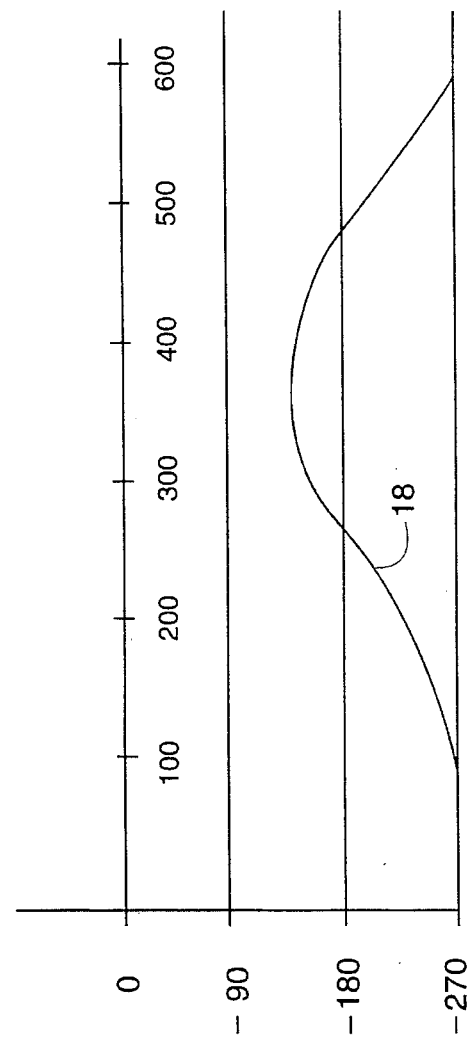
FIG. 2(b) is a phase vs frequency set of curves corresponding to the gain vs frequency curves of FIG. 2.
Figure 3:
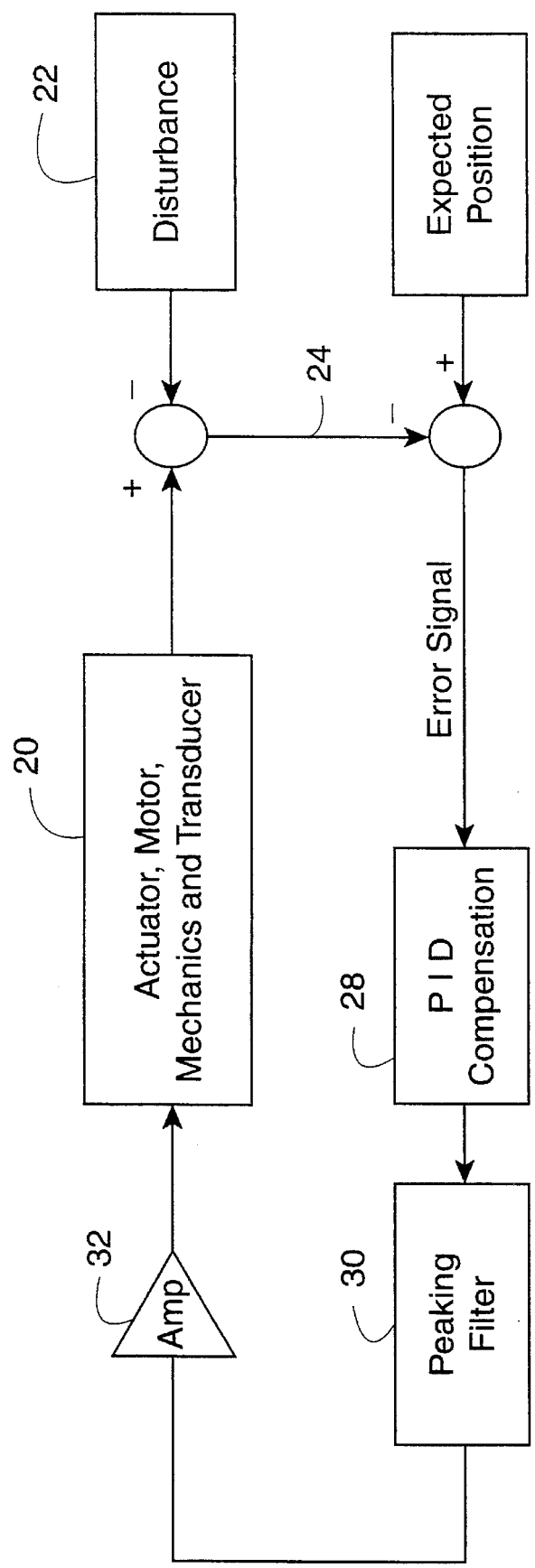
FIG. 3 is a block diagram of the present invention at its highest level of abstraction with the peaking filter in series with a PID phase compensation filter in the feedback loop.

Referring now to the Drawing, FIG. 3 is a block diagram of the present invention at its highest level of abstraction with the inventive feature, a so called peaking filter, shown in series with a phase compensator acting on the position error signal (the peaking filter could also be implemented in parallel with the phase compensation). In FIG. 3, block 20 represents the dynamic equipment. It is the head, the actuator, the actuator motor and mechanical parts for moving the actuator arm. The output of block 20 is the position signal provided by the transducer in the head. This signal takes the form of a digital word indicating the track that the head is over. The transfer function for the actuator and mechanics represented in Laplace transform notation is:

$$\frac{K_t}{j_a s^2} \quad (2)$$

In equation 2, $K_t$ is the torque constant of the motor and $j_a$ is the inertia of the moving parts. Each integration operation in the time domain is represented in the Laplace domain (hereinafter referred to as the "frequency domain") by $1/s$. Thus the $s^2$ term in the denominator of Equation 2 indicates 2 integration operations. Two integrations are required since the output of block 20 is position and the input is acceleration, and these parameters are 2 integrations apart in the time domain.

The oscillation introduced by the slip of the disk on the motor shaft is represented by block 22 labeled Disturbance. The disturbance is the displacement of the track in the radial direction relative to the head. The output of the transducer is, in the scheme of FIG. 3, the signal indicated by reference number 24 which is the combination of the head position assuming perfect concentricity of the track and the radial displacement caused by a disk slip.

A comparison is made between the position of the head as given by output 24 and an expected position of the head as called for by the known location of certain data sectors on the disk. If the head is in the proper place, there is no error and no signal would pass through the feedback loop. If, on the other hand, output signal 24 indicates a location of the head that is different than anticipated, an error signal proportional to the difference between the measured location and the expected location is generated and supplied to the compensation network.

The next major element in the servo is the phase compensator illustrated in FIG. 3 as block 28. In the preferred embodiment, this is a proportional, integral, differential filter ("PID filter"). That is, the transfer function of the PID filter performs those function on the input. The transfer function is given by Equation 3 below.

$$\frac{O_{PID}}{I_{PID}} = \frac{s^2 + sA + B}{s} \quad (3)$$

The integrator which gives the S in the denominator and which adds an additional $-90$ degrees of phase is necessary to reject dc noise. This allows the head to track without a constant error. A PID filter may be implemented in the analog world by a resistor, a capacitor and an inductor connected in parallel. The function of proportional and differential parts of PID filter 28 is to raise the phase of the servo system at the zero db crossover to greater than $-135$ degrees. The coefficients A and B are chosen to achieve the open loop zero db crossover at the proper frequency and the open loop phase to be greater than $-135$ degrees at the zero db crossover point. However, with the PID filter alone in the loop, the gain is not high enough to allow the actuator to follow the track disturbances for advanced high speed disk drives.

The present invention solves this problem by adding a filter, acting on the position error signal, that raises the system gain at a single specified narrow frequency band and does not affect the phase characteristic of the system at the zero db crossover. Still referring to FIG. 3, block 30, labeled Peaking Filter is shown connected in series with PID compensator 28. Of course, the invention could also be implemented by arranging peaking filter 30 and PID filter 28 in parallel. The transfer function of peaking filter 30 is set out in Equation 4 following:

$$\frac{O_{PF}}{I_{PF}} = \frac{As^2 + Bs + C}{s^2 + Ds + E} \quad (4)$$

The coefficients A, B, C, D and E are chosen to select the correct peaking frequency and gain.

A power amplifier 32 supplies current to the actuator motor as represented by block 20. The transfer function of power amplifier 32 corresponds to that of a low pass filter with a cutoff frequency of roughly 10,000 hz—well beyond the operating frequency of the servo loop. This component does not introduce any appreciable phase lag into the system.

FIG. 3 shows a series combination of compensator 28 and peaking filter 30. Those skilled in the art will understand that a parallel implementation is essentially equivalent and contemplated by this invention.

Figure 4:
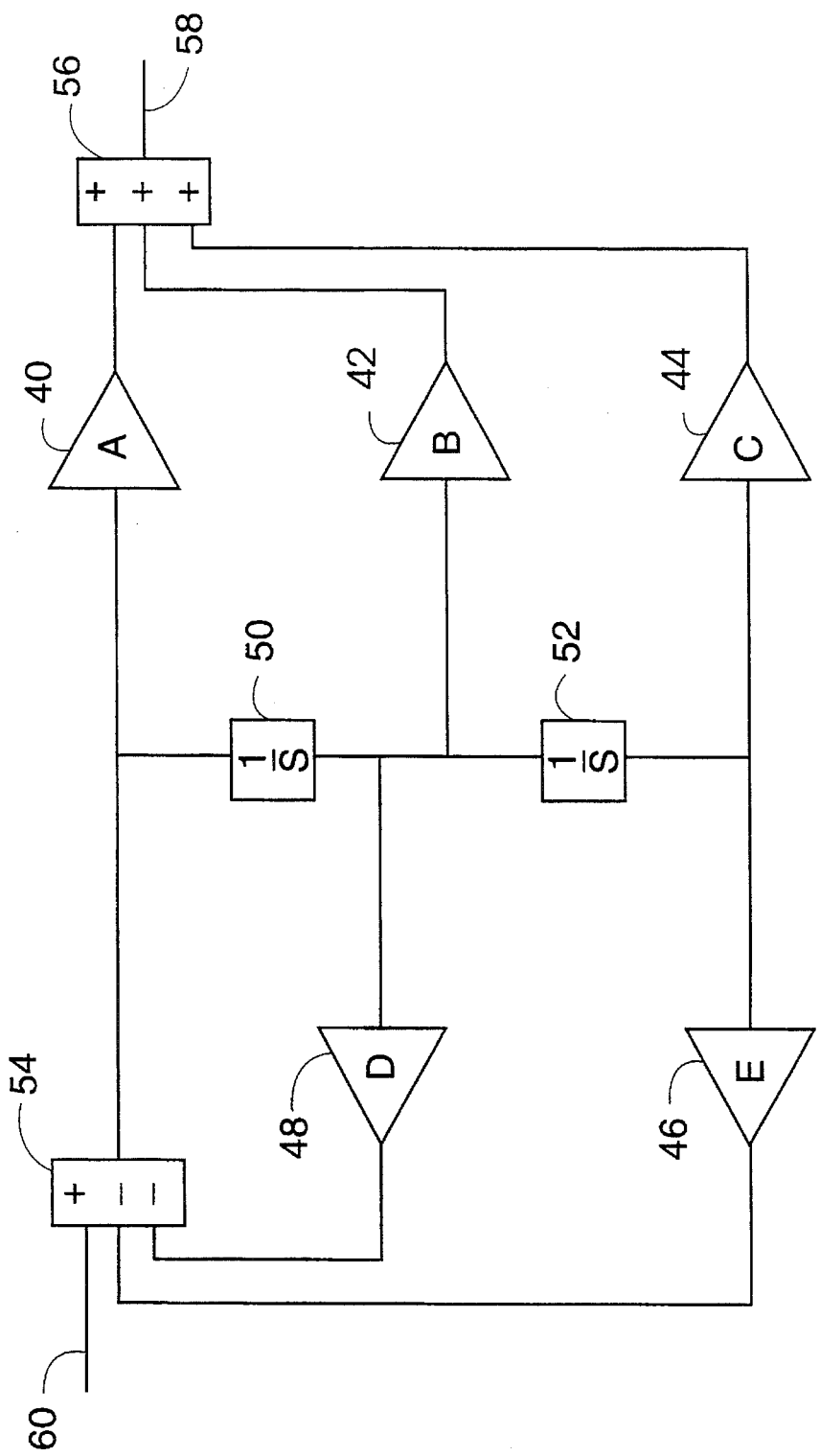
FIG. 4 is a more detailed block diagram of the Peaking Filter.

FIG. 4 is a block diagram of a preferred implementation of peaking filter 30. The block diagram of FIG. 4 when combined in a textbook manner yields the transfer function set out as Equation 4. Referring now to FIG. 4, reference numerals 40, 42, 44, 46 and 48 identify amplifiers with gains of A, B, C, D and E respectively. Integrators 50 and 52 could be capacitors having values of unity. Summing junctions 54 and 56 are conventional and well known in the art. And, output 58 divided by input 60 yields the transfer function set out in Equation 4.

While the present invention applies to an all analog system and is perhaps most easily understood when described in analog terms, as a practical matter, today, the applications are mainly digital. Accordingly, the best mode of operation of the invention is a digital implementation.

Figure 5:
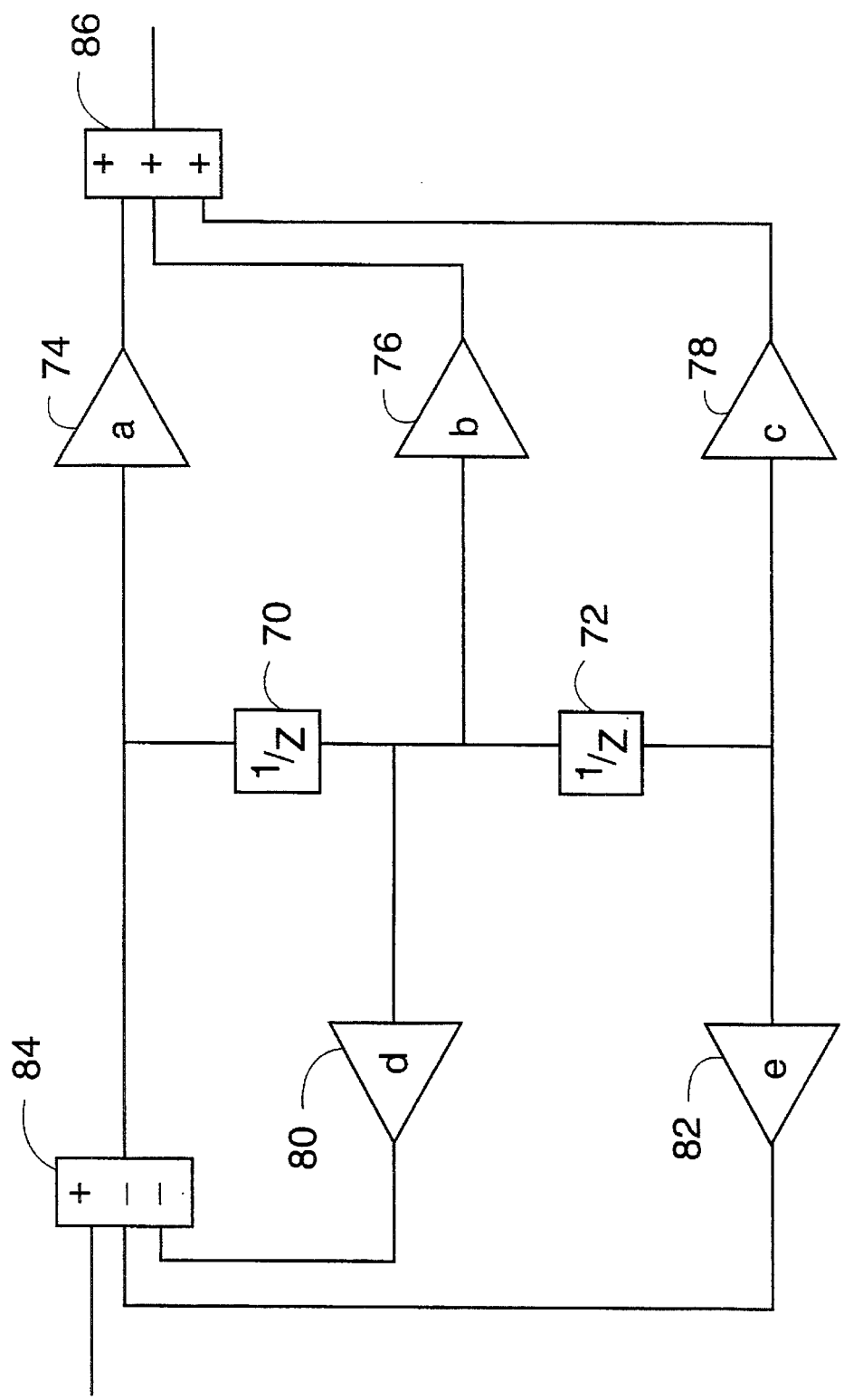
FIG. 5 is a block diagram of a second order digital filter implementation of the Peaking Filter used in a digital implementation of the invention.

FIG. 5 is a block diagram of a second order digital filter that fully implements the peaking filter. In the digital world, the "z-domain" is used as a mathematical language rather than the frequency domain (S-domain). Translations from the frequency domain to the z-domain are text book exercises. The block diagram of FIG. 5 is expressed in terms of the z-domain. At a conceptual level, instead of using an integration ($1/s$) operator as in the analog world, the digital world uses the unit delay ($1/z$) as its fundamental operator. Thus, in FIG. 5, blocks 70 and 72 each represent a delay of one input sample. Blocks 74, 76, 78, 80 and 82 represent gains a through e respectively. Summing blocks 84 and 86 represent accumulations. The transfer function of the second order filter of FIG. 5 is set out as Equation 5 below. Thus in FIG. 5, $$\frac{az^2 + bz + c}{z^2 + dz + e} \quad (5)$$

The coefficients a through e are calculated by well known techniques. Basic theory for such an endeavor may be found in Phillips and Nagle, *Digital Control Systems Analysis and Design*, Practice Hall (1984). Also of considerable utility in determining the coefficients are simulation programs such as *Matlab*, published by The Math Works, Inc.

Figure 6A:
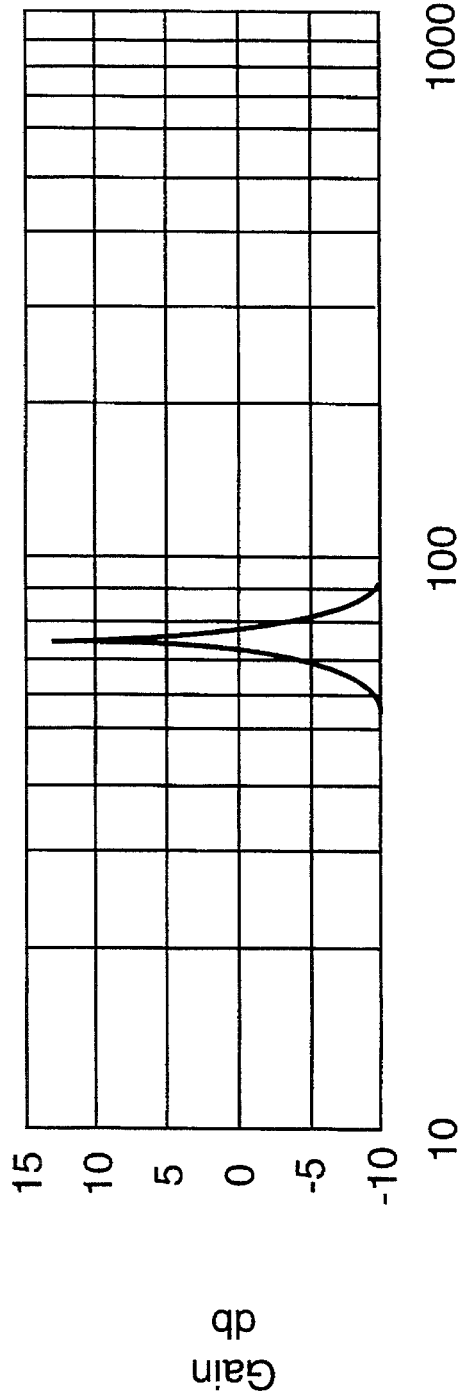
FIG. 6(a) is a semi-log gain vs frequency response curve of the peaking filter of FIG. 5.
Figure 6B:
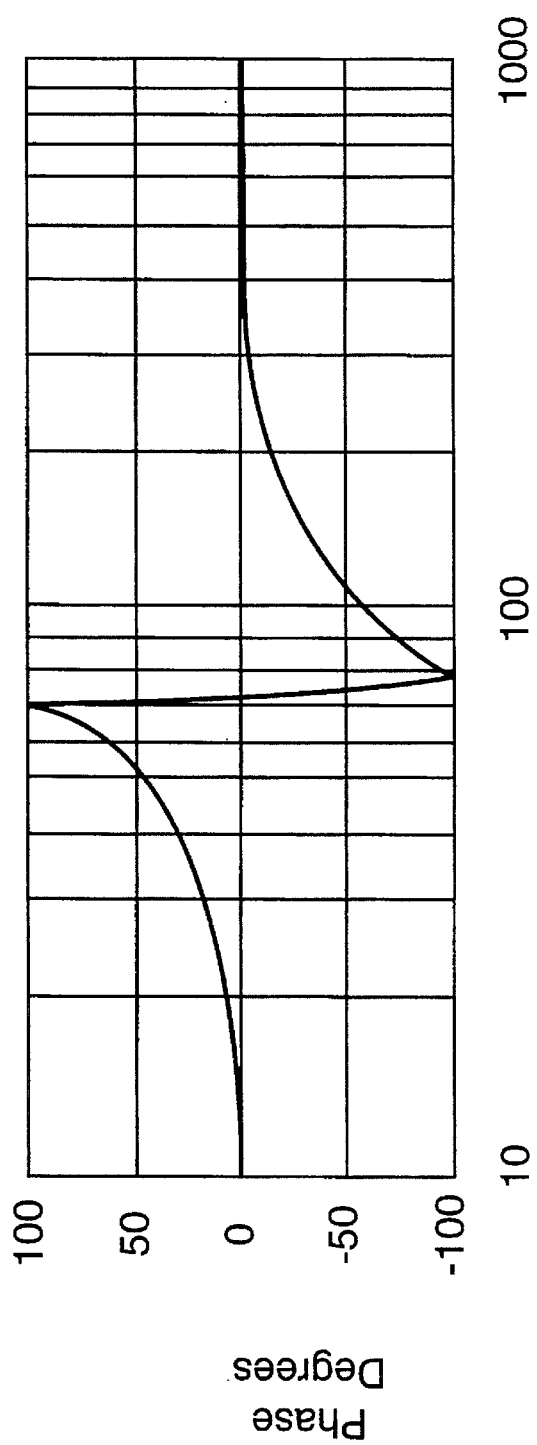
FIG. 6(b) is a semi-log phase vs frequency response curve corresponding to the gain vs frequency curve of FIG. 6(a).

FIG. 6(a) and 6(b) show the gain phase response of the peaking filter of FIG. 5. The transfer function set out in equation 5 may be implemented with several block diagram schemes. The advantage of the block diagram of FIG. 5 is that it minimizes the amount of memory needed—typically in program "scratch" RAM.

Figure 7:
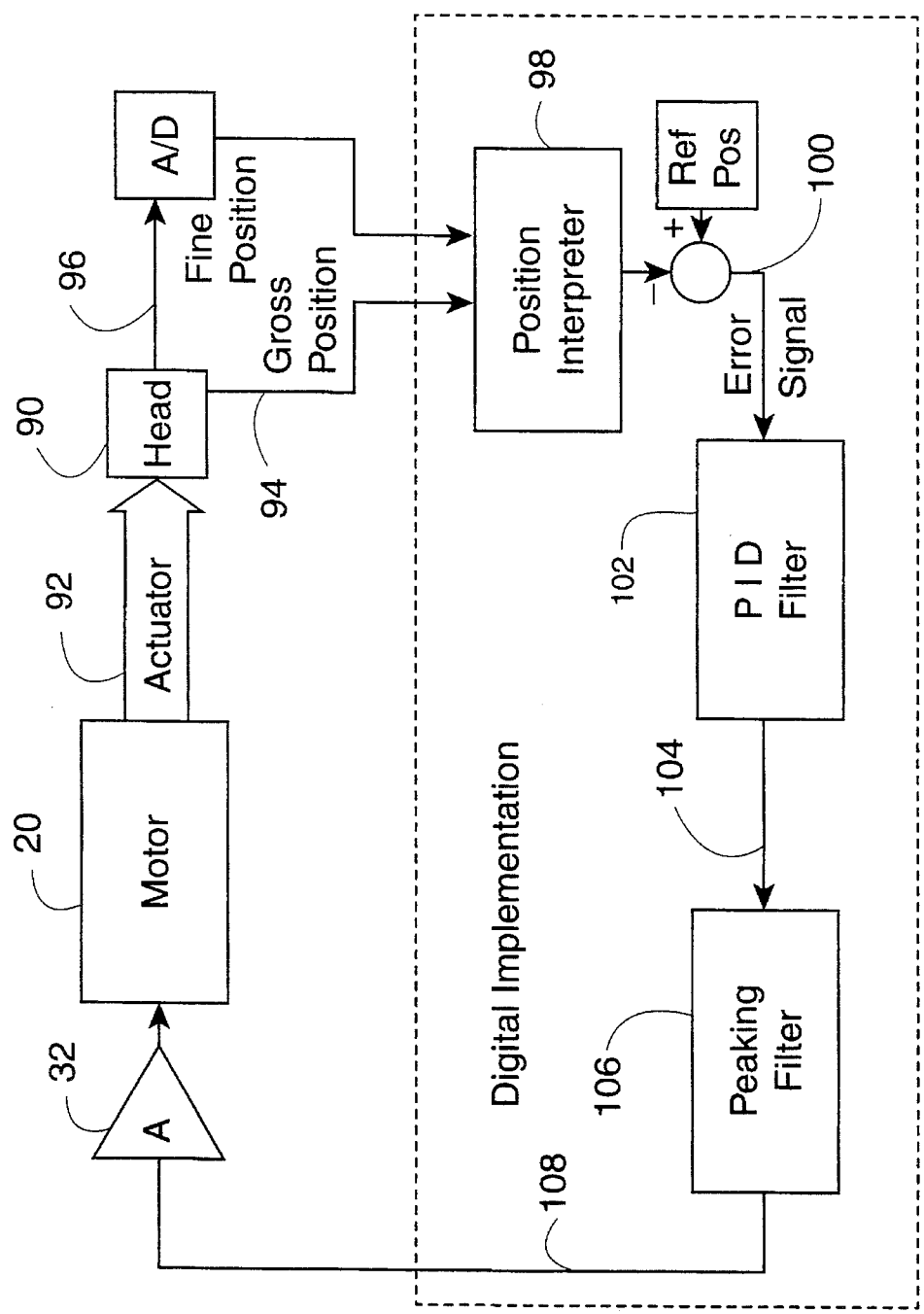
FIG. 7 is detailed block diagram of a preferred implementation of the present invention.

FIG. 7 is a more detailed block diagram of an actuator servo system utilizing the present invention. Referring now to FIG. 7, head 90 contains a magnetic/electric transducer, consisting essentially of a tiny magnetic coil. To write information, a signal is provided to the coil which creates a small magnetic field that changes the polarity of the magnetic domains on a data track. To read information, a current is induced in the coil as it passes through the magnetic flux created by the magnetic domains on the disk. Head 90 is mechanically attached to an actuator arm 92 which is moved in the radial direction of the disk (not shown) by a linear electric motor 20. Motor 20 moves in response to and proportional to current supplied by power amplifier 32. The output from head 90 consists of two parts: a digital signal indicated by reference numeral 94 and an analog signal indicated by reference numeral 96. Digital signal 94 is in the form of an 8 bit gray code digit corresponding to one of the data tracks of the disk. This signal tells the system over which track the head is located.

The precise location of the head over the track, that is, the position of the center of the head with respect to the center of the track, is provided by analog signal 96.

If the center of the head is directly over the center of the track, the fine position 96 voltage out is zero. As the center of the head moves away from the center of the track in one direction, the voltage increases from zero. As the center of the head moves away from the center of the track in the other direction, the voltage increases from zero but with opposite polarity.

Analog signal 96 is supplied to analog to digital converter 97 where it is converted to an 8 bit word which is then combined in position interpreter 98 with digital signal 94 to provide a combined digital word that contains all of the position information. The combined position is compared with a reference position and any difference creates an error signal 100 that indicates how far the head is away from the center of the desired track.

Error signal 100 is then operated on by an algorithm representing a PID filter. Next the result of the PID operation provides a signal represented as reference numeral 104 which is the input to the second order digital filter that performs the peaking filter function. The output of the peaking filter 108 is supplied to the input of power amplifier 32 to close the loop.

Figure 8A:
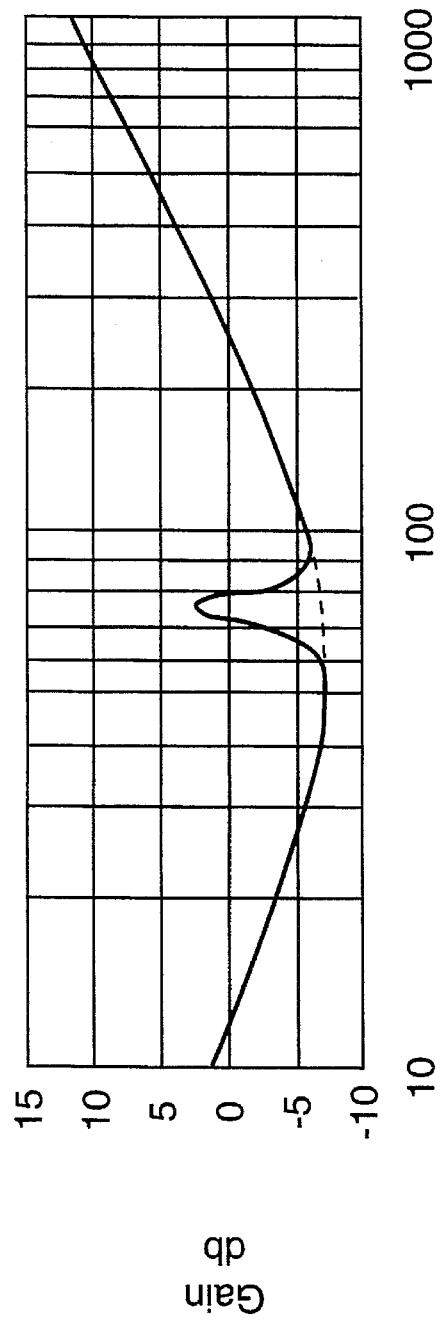
FIG. 8(a) is a semi-log gain vs frequency response of the PID filter and peaking filter elements of FIG. 7.
Figure 8B:
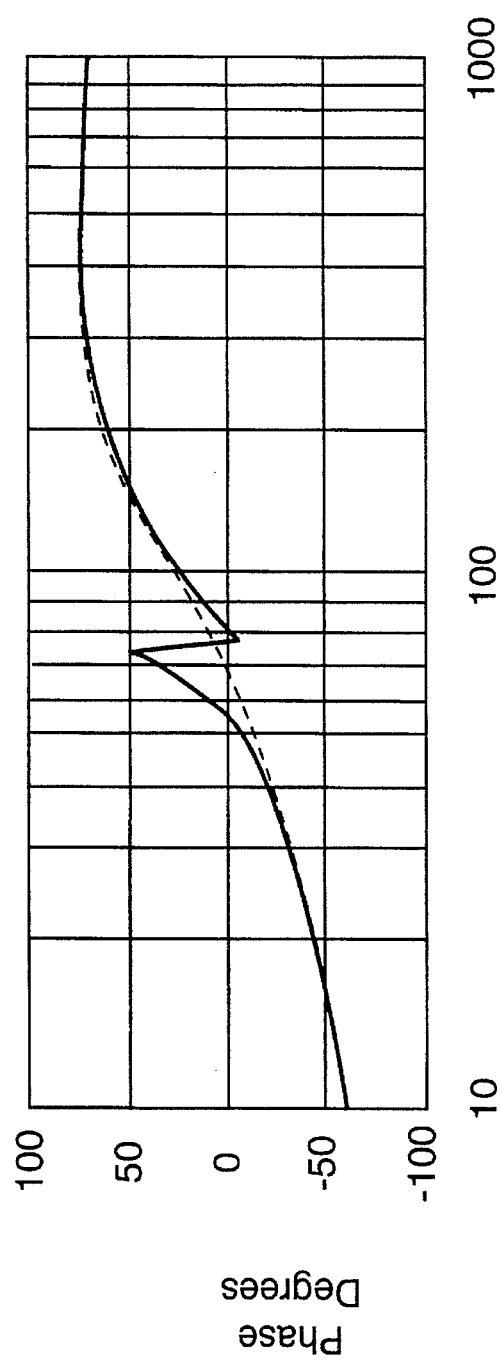
FIG. 8(b) is a semi-log phase vs frequency response corresponding to the gain vs frequency graphs of FIG. 8(a).

FIGS. 8(a) and 8(b) show the gain and phase as a function of frequency respectively for the PID filter and peaking filter combined.

I claim:

1. A data storage apparatus, comprising:
    a data storage disk having a plurality of annular data tracks for storing data, said data storage disk rotating about an axis of rotation at a substantially constant frequency of rotation;
    transducer means for effecting data transfer between a predetermined track of said data storage disk and an exterior environment;
    actuator means, carrying said transducer means, for facilitating radial movement of said transducer means above said data storage disk;
    means for determining a present radial position of said transducer means above said data storage disk;
    means for generating a signal representative of a difference between said present radial position of said transducer means above said data storage disk and a position of said transducer means where said transducer means is aligned with said predetermined track;
    means, coupled to said actuator means, for moving said transducer means to Said position where said transducer means is aligned with said predetermined track; and
    means for compensating for a disturbance to said data storage apparatus, which occurs at the frequency of rotation of said data storage disk and affects the present radial position of said transducer, without substantially affecting the stability of said data storage apparatus.

2. The apparatus, as claimed in claim 1, wherein said means for generating a signal includes a proportional-integral-differential (PID) control device.

3. The apparatus, as claimed in claim 1, wherein said disturbance to said data storage apparatus includes data track eccentricity.

4. The apparatus, as claimed in claim 1, wherein said means for compensating includes means for filtering said signal indicative of a difference, said means for filtering having a transfer function characterized by a relatively high magnitude in a narrow band of frequencies substantially centered about the frequency of rotation of the data storage disk and a relatively low magnitude at frequencies outside of said narrow band of frequencies.

5. The apparatus, as claimed in claim 4, further comprising:
    a proportional-integral-differential (PID) control device acting on said signal indicative of a difference in parallel with said means for filtering.

6. The apparatus, as claimed in claim 4, wherein said means for filtering includes a digital filter of at least second order.

7. The apparatus, as claimed in claim 1, wherein said means for compensating includes amplification means for amplifying said signal indicative of a difference by a relatively high gain factor in a narrow frequency band substantially centered about said frequency of rotation of said data storage disk and by a relatively low gain factor at frequencies outside of said narrow frequency band.

8. In a position servo system for controlling the position of a transducer mounted on a movable actuator over any selected location in the radial direction of a data disk rotating at a fixed frequency of rotation, said data disk having a plurality of data tracks and a plurality of spaced apart position markers which are detectable by said transducer such that said transducer supplies a position signal indicating the position of said transducer over said disk, a feedback loop being operatively connected between said transducer and said actuator and capable of comparing the position indicated by said position signal with a desired position and providing an output error signal to said actuator that drives said actuator such that said transducer moves closer to the desired position, an improvement including:
    compensation means disposed within said feedback loop for compensating for a disturbance to said position servo system, which occurs at the frequency of rotation of said data disk, without substantially affecting the stability of said position servo system;
    wherein said compensation means includes a filter having a transfer function characterized by a relatively high magnitude in a narrow band of frequencies substantially centered about the frequency of rotation of said data disk and a relatively low magnitude at frequencies outside of said narrow band of frequencies.

9. The servo system of claim 8 wherein said compensation means includes a filter having a transfer function including the ratio of two second order polynomials.

10. The servo system of claim 8 wherein said feedback loop includes proportional-integral-derivative components working cooperatively with said compensation means such that the phase of said servo system at the zero db crossover frequency is greater than −135 degrees.

11. In a data storage apparatus including a transducer for data transfer with a data storage disk that is rotating at a constant frequency of rotation and upon which position information has been encoded, a transducer position servo system, comprising:
    actuator means upon which said transducer is mounted, said actuator means for positioning the transducer over any selected position in the radial direction of the disk;
    position signal decoding means responsive to said information encoded on said data storage disk for providing an output signal indicative of the position of said transducer over said disk;

error signal generator means operatively connected to said position signal decoding means for comparing the position indicated by said position signal with a desired position and providing an output error signal indicative of the difference in said positions;

a feedback loop operatively connected between said position signal decoding means and said actuator means, said feedback loop including:

phase adjustment means for ensuring the stability of said servo system; and compensation means for compensating for disturbances which affect the position of said transducer over said data storage disk and which occur at the rotating frequency of said disk without substantially affecting the phase of said feedback loop.

12. The servo system of claim 11 wherein said compensation means has a transfer function that includes the ratio of two second order polynomials.

13. The servo system of claim 11 wherein said phase adjustment means consists of filter means for reducing the phase lag between the input and the output of said feedback loop when combined with said actuator phase lag to less than 135 degrees at the frequency that the open loop gain of said servo system has a gain of unity.

14. The servo system of claim 12 wherein said compensation means includes filter means having a transfer function characterized by a relatively high magnitude in a narrow band of frequencies substantially centered about the frequency of rotation of said data disk and a relatively low magnitude at frequencies outside of said narrow band.

15. In a digital data storage apparatus including (i) a data storage disk that is rotating at a constant frequency and upon which a plurality of concentric data tracks are encoded, said data tracks including both gross position indicators and fine position indicators, and (ii) a mechanical actuator for positioning a data read/write transducer over a selected data track, a transducer position servo system, comprising:

(a) first digital computer means, responsive to position information created by sensing said gross position indicators using said data read/write transducer, for providing a digital output signal indicative of the gross position of said transducer over said disk;

(b) analog means, responsive to position information created by sensing said fine position indicators using said data read/write transducer, for providing an analog signal indicative of the fine position of said transducer over said disk;

(c) analog to digital converter means for converting said analog signal indicative of fine transducer position to a digital output signal indicative of fine transducer position;

(d) second digital computer means for combining said digital output signal indicative of gross position and said digital output signal indicative of fine position into a composite position signal;

(e) third digital computer means for comparing said composite position signal with a desired position and providing an error signal indicating the difference in said positions;

(f) fourth digital computer means for performing proportional-integral-differential operations on said error signal;

(g) fifth digital computer means for performing a digital algorithm on said error signal said fifth digital computer means having a transfer function characterized by a relatively high magnitude in a narrow band of frequencies substantially centered about the frequency of rotation of said data disk and a relatively low magnitude at frequencies outside of said narrow band, said fifth digital computer means creating a digital computer output signal and (h) amplifier means, responsive to said digital computer output signal, for supplying an electrical current proportional to said digital computer output signal to said mechanical actuator.

16. The apparatus, as claimed in claim 7, wherein said amplification means is a part of a servo system having a servo loop which feeds back positional information from said means for generating to said means for moving.

17. The apparatus, as claimed in claim 16, wherein said amplification means does not substantially affect the phase of said servo system at unity gain frequency.

18. The apparatus, as claimed in claim 7, wherein said narrow frequency band is small relative to a band of frequencies bounded by zero frequency and a unity gain frequency of said data storage apparatus.

19. The servo system of claim 11, wherein said phase adjustment means includes proportional-integral-differential circuitry.

* * * * *